United States Patent
McKee et al.

[11] Patent Number: 6,023,515
[45] Date of Patent: Feb. 8, 2000

[54] MASS EXCITED ACOUSTIC DEVICE

[75] Inventors: John M. McKee, Hillsboro Beach; Charles W. Mooney, Lake Worth; Irving Harold Holden, *deceased, late of Boca Raton, by Virginia Holden, executor*; Gerald Eugene Brinkley, Wellington; Philip P. Macnak, West Palm Beach, all of Fla.

[73] Assignee: Motorola, Inc., Schaumburg, Ill.

[21] Appl. No.: 08/804,188

[22] Filed: Feb. 21, 1997

[51] Int. Cl.[7] .............................. H04R 25/00; H04R 5/00; H04R 1/02

[52] U.S. Cl. ...................... 381/150; 381/396; 340/391.1

[58] Field of Search ................................ 381/396, 431, 381/412, 150, FOR 152; 340/388.1, 384.7, 391.1

[56] References Cited

U.S. PATENT DOCUMENTS

| | | | |
|---|---|---|---|
| 4,130,740 | 12/1978 | Cogan | 179/103 |
| 4,691,383 | 9/1987 | DeMars | 455/351 |
| 4,718,098 | 1/1988 | Ashworth | 381/64 |
| 5,023,504 | 6/1991 | Mooney et al. | 310/322 |
| 5,058,173 | 10/1991 | Ashworth | 381/152 |
| 5,107,540 | 4/1992 | Mooney et al. | 381/192 |
| 5,172,092 | 12/1992 | Nguyen et al. | 340/311.1 |
| 5,327,120 | 7/1994 | McKee et al. | 340/825.46 |
| 5,524,061 | 6/1996 | Mooney et al. | 381/151 |
| 5,649,020 | 7/1997 | McClurg et al. | 381/151 |

OTHER PUBLICATIONS

"The Technique of Violin Making" by H.S. Wake, copyright 1973, pp. 43–51.

"Scientific American—Acoustics of Violins", Oct. 1981, vol. 245, No. 4, copyright 1981.

*Primary Examiner*—Curtis A. Kuntz
*Assistant Examiner*—Dionne Harvey
*Attorney, Agent, or Firm*—Philip P. Macnak

[57] ABSTRACT

A mass excited acoustic device (1100) includes a soundboard (1102), a pedestal (1104) and a transducer (300). The soundboard (1102) has a predetermined resonance frequency and couples motional energy to a device user. The pedestal (1104) includes a platform (1106) formed for mounting a transducer (300), and a foot (1108). The platform (1106) and foot have an axis extending centrally therethrough. The foot (1108) is contiguous to the platform (1106) and to the soundboard (1102), and is substantially smaller in size than the platform (1106) and separates the platform (1106) from the soundboard (1102). The transducer (300) is coupled to the platform (1106) about the axis and converts an electrical input signal into motional energy generated in a direction parallel to the axis. The motional energy is delivered to the soundboard (1102) through the foot (1108) without substantially modifying the resonance frequency of the soundboard (1102).

25 Claims, 9 Drawing Sheets

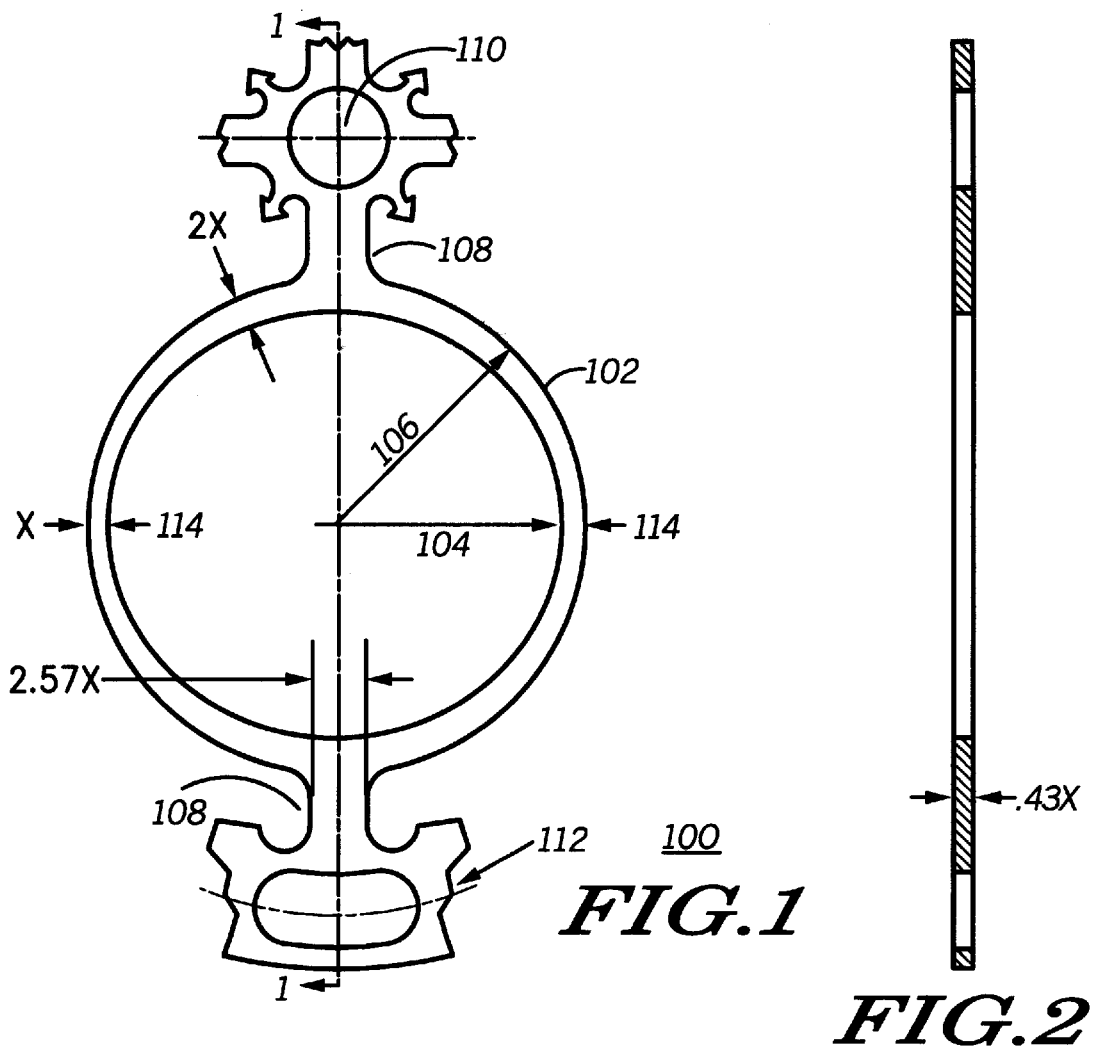
FIG. 1
FIG. 2
FIG. 14

MASS EXCITED ACOUSTIC DEVICE

FIELD OF THE INVENTION

This invention relates in general to electromagnetic transducers, and more specifically to a mass excited acoustic device which is used to generate a voice reproduction of an audible voice message signal using a tuned soundboard.

BACKGROUND OF THE INVENTION

Portable radiotelephones, such as pocket-sized cellular telephones and second generation (CT2) cordless telephones are becoming increasingly more popular, especially as the size and the cost of the portable radiotelephones has been reduced. Current portable radiotelephones utilize an audible ringing signal to alert the portable radiotelephone user of an incoming call. There are, however, drawbacks to the use of an audible ringing signal. One such drawback is that when the portable radiotelephone is carried in a pocket, the audible ringing signal can become muffled, which can result in the portable radiotelephone user missing a call. Furthermore, there are many areas of public business, such as in theaters and in restaurants, where the use of devices providing an audible ringing signal are being banned, because the audible ringing signal is an annoyance to other customers at the establishment.

Tactile, or silent alerting devices have been utilized for some time in portable communication devices, such as pagers, to provide a vibratory alert signal. The tactile alerting device of choice in prior art portable communication devices has been a motor driven eccentric weight vibrator. While such motor driven eccentric weight vibrators have proved acceptable for use in some portable communication devices, they are generally unacceptable for use in current portable radiotelephones due to the increased space which is required to mount the motors. Also, most portable radiotelephones have only a very limited battery life, and the use of a motor driven eccentric weight vibrator which requires a significant current drain for operation would further reduce the operating time available for such portable radiotelephones.

A transducer providing both tactile and audio outputs is described in U.S. patent application Ser. No. 07/909,261 filed Jul. 6, 1992 by McKee et al., entitled "Stabilized Electromagnetic Resonant Armature Tactile Vibrator". While such a transducer is capable of providing tactile and audio outputs in a portable communications device, such as a portable radiotelephone, the conventional mounting methods which are available have generally been unsuccessful in providing an audio frequency response which provides an adequate low frequency, or bass response.

What is therefore needed is an improved means for mounting a transducer which can be used in a portable radiotelephone, or other sound-producing device. The improved means for mounting should enable the soundboard to be optimized for resonance frequency which providing a means for directly driving the soundboard to provide an enhanced bass response, and should be compatible with any of a number of transducers.

SUMMARY OF THE INVENTION

In a preferred embodiment of the present invention a mass excited acoustic device which comprises a soundboard which has a predetermined resonance frequency, and which couples motional energy to a device user; and a pedestal which comprises a foot and a platform which is formed for mounting a tranducer, wherein the foot has a cross-sectional area which is substantially smaller in size than the platform and which connects and separates the platform from the soundboard. The transducer converts an electrical input signal into motional energy generated in a direction along an axis perpendicular to said cross-sectional area of said foot. The motional energy is delivered to the soundboard through the foot without substantially modifying the resonance frequency of the soundboard.

In an alternate embodiment of the present invention, a mass excited acoustic device comprises a soundboard which has a predetermined resonance frequency and which couples motional energy to a device user; a pedestal which comprises a foot and a platform, wherein the foot has a cross-sectional area which is substantially smaller in size than the platform and which connects and separates the platform from the soundboard; and a dual mode transducer. The dual mode transducer comprises an electromagnetic driver which is coupled to the platform and which effects an alternating electromagnetic field in response to an audio input signal. An armature is coupled to the electromagnetic driver and includes upper and lower substantially parallel planar suspension members each comprising a plurality of independent planar circular non-linear spring members arranged regularly about a central planar region within a planar perimeter region, and a magnetic motional mass suspended between the upper and lower substantially parallel planar suspension members about the central planar region, and coupled to the alternating electromagnetic field for alternatively moving the magnetic motional. Movement of the magnetic motional mass is transformed through the plurality of independent planar circular non-linear spring members and the electromagentic driver into motional energy which is generated in a direction along an axis which is perpendicular to the cross-sectional area of the foot. The motional energy is delivered to the soundboard through the foot without substantially modifying the resonance frequency of the soundboard to provide an audio output having an enhanced bass response.

In a first aspect of the present invention an audio delivery system comprises an audio source which generates audio input signals; a processor which processes the audio input signals to drive a transducer; and one or more mass excited acoustic devices. The mass excited acoustic devices comprise a soundboard which has a predetermined resonance frequency and which couples motional energy delivered to the soundboard to a device user. A pedestal comprises a foot and a platform which is formed for mounting the transducer. The foot has a cross-sectional area which is substantially smaller in size than the platform and connects and separates the platform from the soundboard. The transducer converts the audio input signals into motional energy which is generated in a direction along an axis perpendicular to the cross-sectional area of the foot. The motional energy is delivered to the soundboard through the foot without substantially modifying the resonance frequency of the soundboard. A housing is coupled to the soundboard to enclose the pedestal and the transducer.

In accordance with a second aspect of the present invention a personal communication device comprises a housing having a portion thereof which forms a soundboard having a predetermined resonance frequency. A pedestal is enclosed within the housing and comprises a platform and a foot. The foot has a cross-sectional area which is substantially smaller in size than the platform and connects and separates the platform from the soundboard. A receiver is enclosed within the housing and receives and detects received coded message signals which are processed by a processor. A transducer, comprises an electromagnetic driver, and armature, and a magnetic motional mass. The electromagnetic driver is coupled to the platform and effects an alternating electromagnetic field in response to processing the coded message signals. The armature is coupled to the electromagnetic driver and includes upper and lower substantially parallel planar suspension members, each comprising a plurality of independent planar circular non-linear spring members arranged regularly about a central planar region within a planar perimeter region. The magnetic motional mass is suspended between the upper and lower substantially parallel planar suspension members about the central planar region, and coupled to the alternating electromagnetic field for alternatively moving the magnetic motional mass. Movement of the magnetic motional mass. Movement of the magnetic motional mass is transformed through the plurality of independent planar circular non-linear spring members and the electromagnetic driver into motional energy generated in a direction along an axis perpendicular to the cross-sectional area of the foot.

BRIEF DESCRIPTION OF THE DRAWINGS

FIG. 1 is a top view of a planar non-linear spring member which is utilized in a mass excited acoustic device in accordance with the preferred embodiment of the present invention.

FIG. 2 is a cross-sectional view taken along line 1—1 of FIG. 1.

FIG. 14 is a signaling diagram depicting the operation for the mass excited acoustic device in accordance with the preferred embodiment of the present invention.

DESCRIPTION OF THE PREFERRED EMBODIMENT

Figure 3:
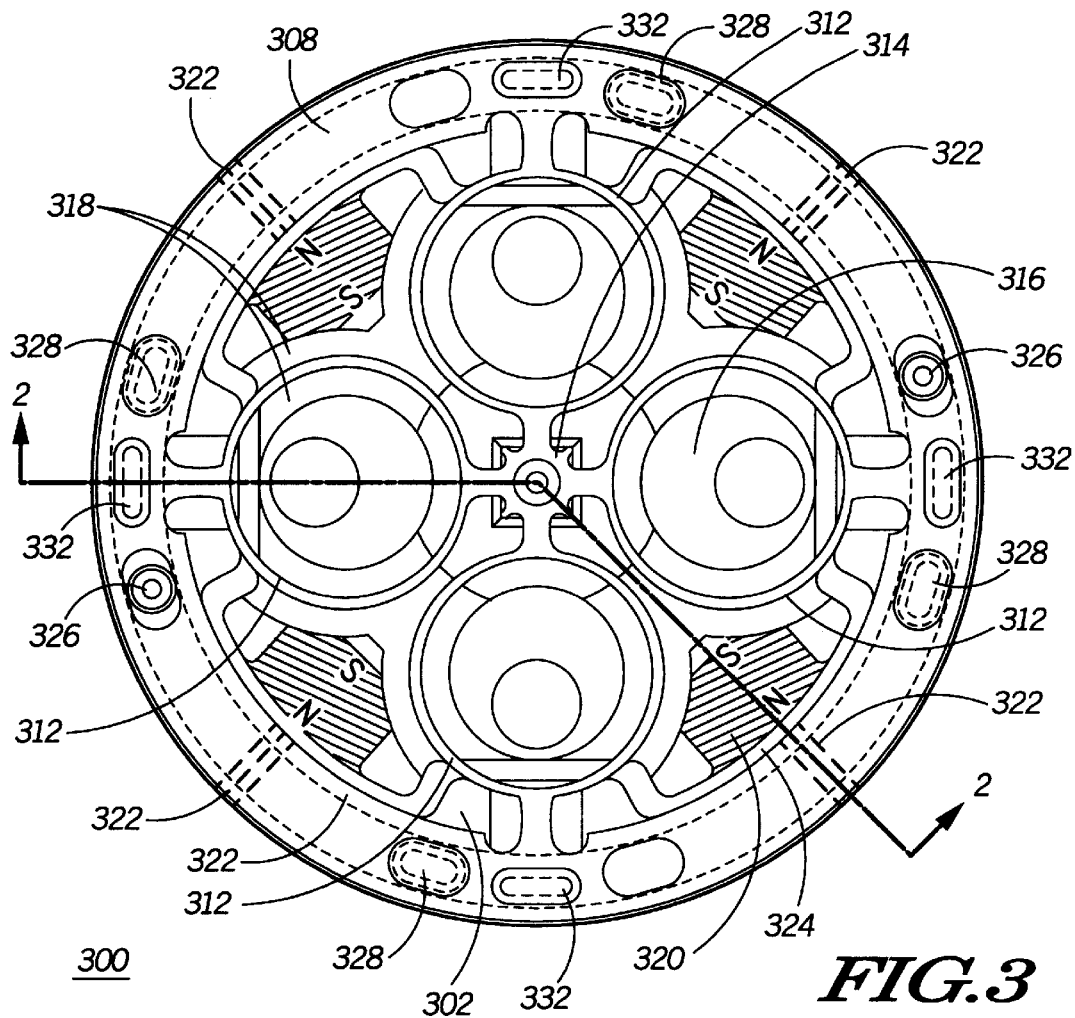
FIG. 3 is an orthogonal top view of a dual mode transducer utilized in the mass excited acoustic device in accordance with the preferred embodiment of the present invention.

With reference to FIG. 1, there is shown a top view of a planar non-linear spring member 100 utilized in a mass excited acoustic device in accordance with the preferred embodiment of the present invention. The planar non-linear spring member 100 has a planar, substantially circular spring member 102 having in one embodiment a circular inner diameter 104 and a circular outer diameter 106, and in an improved embodiment an elliptical inner diameter 104 and a circular outer diameter 106, as shown in FIG. 1.

The improved embodiment of the planar non-linear spring member 100 shown in FIG. 1 provides a spring member having a non-uniform width, the width "2X" being the widest in the region contiguous to the end restraints 108, and tapering to a width "X" about the midpoints 114 of the substantially circular planar spring members 102. The circular spring members 102 couple through end restraints 108 of substantially uniform width "2.57X" to a central planar region 110 and to a planar perimeter region 112.

FIG. 2 is a cross-sectional view taken along line 1—1 of FIG. 1. As shown, the thickness of the improved planar non-linear spring member 100 is by way of example "0.43X". It will be appreciated that the dimension and thickness of the planar non-linear spring member 100 affects the resonant frequency at which the dual mode vibrator resonates, and can be changed to accommodate different operating frequencies.

FIG. 3 is an orthogonal top view of a dual mode transducer 300 (with circuit board 306 removed). Shown in FIG. 3 is a coil form 302 which by way of example is approximately 0.7 inch (17.78 mm) in diameter and which encloses an electromagnetic coil 304 (FIG. 4) which functions as an electromagnetic driver for generating an alternating magnetic field in response to an excitation signal, such as an audio input signal. The coil form 302 is manufactured using conventional double shot injection molding techniques using a plastic material, such as a thirty-percent glass-filled liquid crystal polymer which fully encloses the coil 304 except for terminals 326 which provide electrical connection to the coil 304. It will be appreciated that other plastic materials can be utilized for the coil form 302 as well. The coil form 302 establishes two planar perimeter seating surfaces 330 (FIG. 4) about a planar perimeter region 308 on which two planar suspension members 310 are supported, and further includes eight contiguously molded bosses 332 which are used to orient and affix the planar spring members 310 to the coil form 302 using a staking process, such as using heat or ultrasonics.

Each of the two planar suspension members 310 comprises four independent planar non-linear spring members 312 arranged regularly around a central planar region 314 which is used for positioning and fastening a moveable mass 316 to the two planar suspension members 310 also using a staking process. The planar non-linear spring members 312 are defined as having a circular outer perimeter and a circular or elliptical inner perimeter such as described in FIG. 1 above. The planar suspension members 310 are manufactured from a sheet metal, such as Sandvik™ 7C27M02 stainless martensitic chromium steel alloyed with molybdenum, or a 17-7 PH heat treated CH900 precipitation-hardened stainless steel. It will be appreciated that other materials can be utilized as well. The sheet metal thickness is preferably 0.002 inch (0.0508 mm) thick, and the planar suspension members are formed preferably by chemical etching, or machining technique. The movable mass 316 is manufactured using conventional die casting techniques using a Zamak 3 zinc die-cast alloy, although it will be appreciated that other materials can be utilized as well.

The arrangement of the parts of the dual mode transducer 300 is such that the movable mass 316 can be displaced upwards and downwards in a direction normal to the planes of the two planar suspension members 310, the displacement being restricted by a restoring force provided by the independent planar non-linear spring members 312 in response to the displacement. The movable mass 316 is formed such that there are shaped channels 318 for allowing the movable mass 316 to extend through and around the independent planar non-linear spring members 312 during excursions of the movable mass 316, thereby providing a greater mass to volume ratio for the dual mode transducer 300 than would be possible without the shaped channels 318. A driving force for the movable mass 316 is produced by four radially polarized permanent magnets 320 attached to the movable mass 316 and magnetically coupled to the electromagnetic coil 304. The permanent magnets 320 are manufactured using Samarium Cobalt having a Maximum Energy Product of 28–33 and have a N-S radial orientation to produce a coercive force of 8K-11K Oersteds. The two planar suspension members 310, the movable mass 316, and the four permanent magnets 320 comprise a resonant armature system for the dual mode transducer 300.

An additional detail shown in FIG. 3 comprises four radial projections 322 projecting in a direction normal to each surface (top and bottom) of the coil form 302 for compressively engaging with the planar perimeter region 308 of the top planar suspension member 310. The projections 322 pre-load the planar perimeter region 308 after the planar suspension member 310 is attached to the surface of the coil form 302 using bosses 332 located on either side of each of the protrusions 322. The bosses 332 are staked using heat or ultrasonic to secure the planar suspensions members 310 to the planar perimeter region 308 of the coil form 302. The purpose of pre-loading is for preventing audible (high frequency) parasitic vibrations during operation of the dual mode transducer 300.

Figure 4:
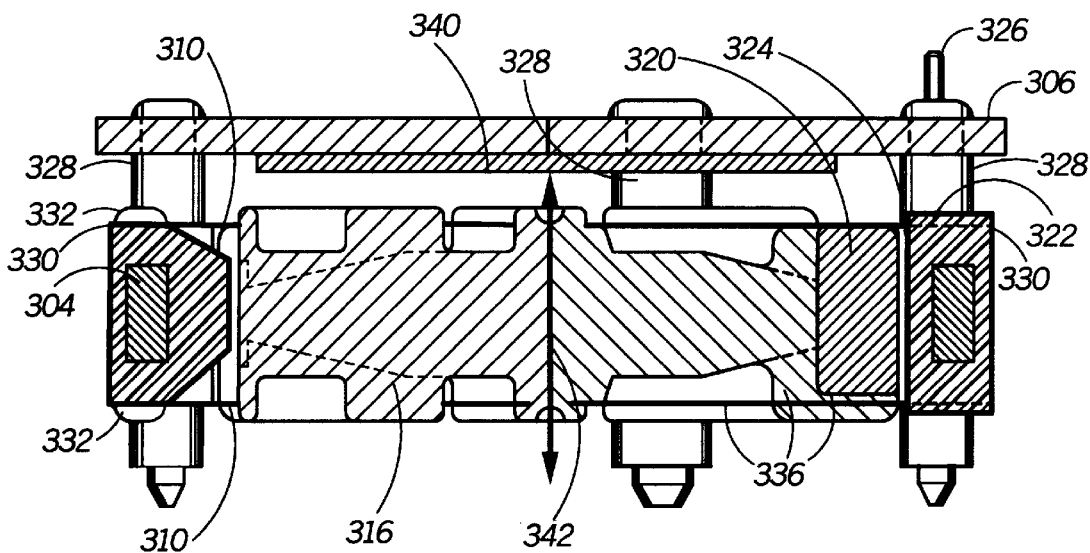
FIG. 4 is a cross-sectional view taken along the line 2—2 of the dual mode transducer of FIG. 3.

With reference to FIG. 4, a cross-sectional view taken along the line 2—2 of the dual mode transducer of FIG. 3 clearly shows an air gap 324. The air gap 324 surrounds the movable mass 316 (partially shown), thus allowing the movable mass 316 to move in a direction normal to the planes of the two planar suspension members 310. During operation, the electromagnetic coil 304 generates an alternating magnetic field polarized in a direction parallel to an axis 342 through the center of the resonant armature system 336 which comprises the movable mass 316, the magnetic members 320 and the planar suspension members 310, at a frequency substantially the same as the fundamental resonant frequency of the resonant armature system 336. The alternating magnetic field is generated when a drive signal is coupled to the electromagnetic coil 304, the drive signal being preferably a swept low frequency drive signal to produce a tactile alert, or an audible drive signal to produce an audible response. The alternating magnetic field generated is magnetically coupled to the four permanent magnets 320 that are physically coupled to the movable mass 316. The magnetic coupling produces an alternating excitation force on the resonant armature system 336, and causes the resonant armature system 336 to vibrate with a displacement direction parallel to the axis 342 when the swept low frequency drive signal or the audible drive signal is provided. When the dual mode transducer 300 is installed in a device, e.g., a personal portable radiotelephone, such that the dual mode transducer 300 is oriented with the axis 342 normal to a user's body, a strong tactile response is advantageously generated with less power input to the dual mode transducer 300 than would be required by conventional vibrators. This increase in efficiency is obtained because the dual mode transducer 300 overcomes many power wasting characteristics associated with earlier vibrator designs.

While the preferred embodiment according to the present invention uses the electromagnetic coil 304 interacting with the permanent magnets 320 for generating the alternating excitation force, other means, e.g., piezoelectric means, could be used as well for generating the alternating excitation force.

Figure 5:
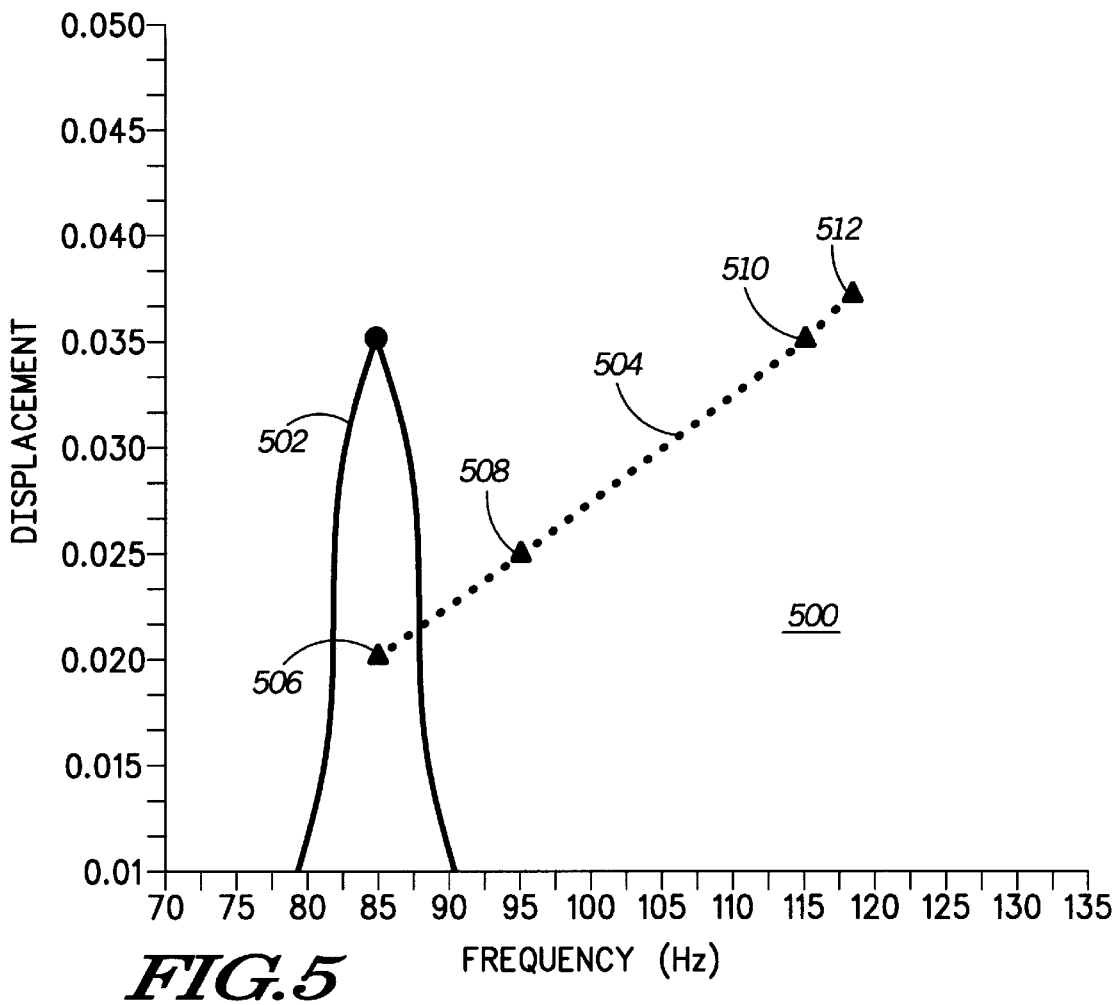
FIG. 5 is a graph comparing the amplitude versus fundamental frequency response of a linear resonant vibrator system and the dual mode transducer.

FIG. 5 is a graph 500 comparing the displacement versus fundamental frequency response of the dual mode transducer and an equivalent linear resonant vibrator system. A frequency response curve 502 is shown for the linear resonant vibrator system which is driven, for example, with an excitation voltage of 0.9 volts, and which in response thereto produces a peak displacement of 0.035 inches (0.89 mm) at a center driving frequency of 85 Hz and corresponds to an impulse output of 27 g's which is calculated from the following formula:

$$g's = 0.10235 \, (d)(f)^3$$

where g is the impulse output generated by the system, d is the displacement of the vibrating mass, and f is the driving frequency.

As shown by the frequency response curve 502, the linear resonant vibrator system is high-Q, and the impulse output falls off rapidly on either side of the peak center frequency. Consequently, great care must be taken to insure the driving frequency is controlled to match the peak center frequency to maximize the impulse output. Any variation in driving frequency, and more particularly, in the response of the linear resonant vibrator system due to manufacturing tolerances can result in a significant reduction in the impulse output generated.

In contrast, the dual mode transducer is a hardening spring type resonant system and can provide a significant impulse output over a very broad range 504 of driving frequencies. Impulse outputs are tabulated below for the hardening spring type resonant system, when also driven as described above with the same excitation voltage of 0.9 volts as compared to the linear resonant vibrator system:

| Ref. | Impulse (g's) | Displacement (in./mm) | Driving Frequency (Hz) |
|------|---------------|----------------------|-----------------------|
| 506  | 12            | 0.020/.51            | 85                    |
| 508  | 24            | 0.025/.64            | 95                    |
| 510  | 45            | 0.035/.89            | 115                   |

Above point 512, the impulse output of the dual mode transducer falls off rapidly, as will be described below. As can be seen from the table above, a significantly higher impulse response can be achieved as compared to the linear resonant vibrator system without the restrictions on controlling the center driving frequency.

Figure 6:
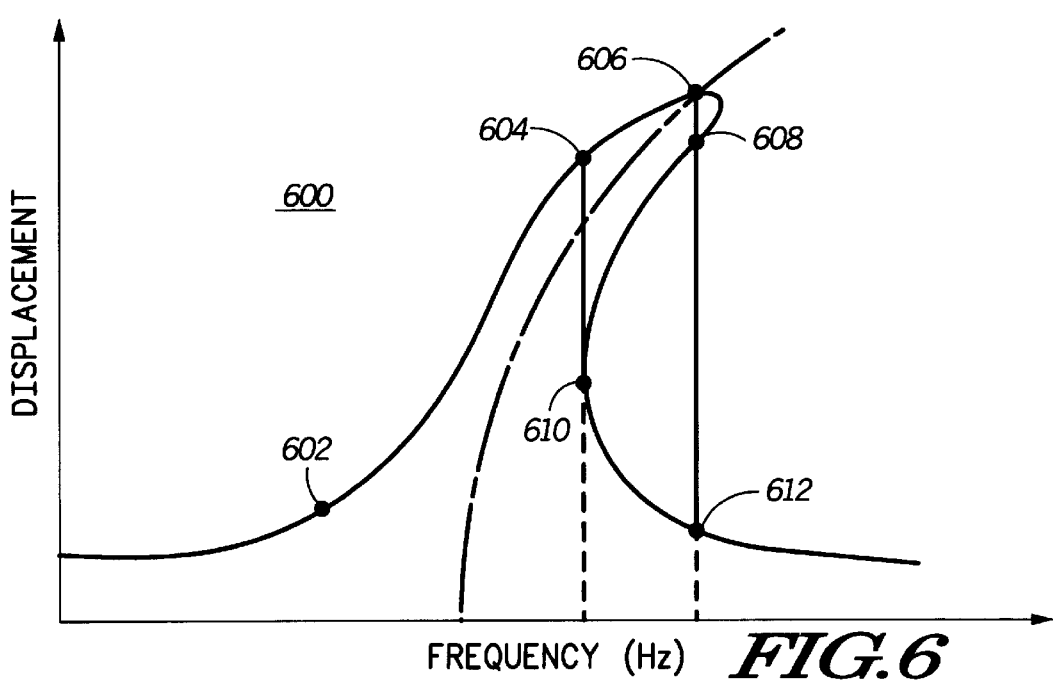
FIG. 6 is a graph depicting the impulse output as a function of frequency for a dual mode transducer utilizing a hardening spring type resonant system.

FIG. 6 is a graph 600 depicting the impulse output as a function of frequency for a dual mode transducer utilizing a non-linear, hardening spring type resonant system. Unlike a linear resonant vibrator system which requires a carefully controlled driving frequency to insure maximum impulse output, the dual mode transducer utilizing a non-linear, hardening spring type resonant system is preferably driven by a swept driving frequency, operating between a first driving frequency to provide a lower impulse output 602 and a second driving frequency to provide an upper impulse output 604. The upper impulse output 604 is preferably selected to correspond substantially to the maximum driving frequency at which there is only a single stable operating state. As can be seen from FIG. 6, two stable operating states 604 and 610 are possible when the driving frequency is set to that required to obtain impulse output 610, and as the driving frequency is increased therefrom, three stable operating states can exist, such as shown by example as impulse outputs 606, 608 and 612. It will be appreciated, that only those impulse responses which lie on the curve 600 between operating states 602 and 604 are desirable when utilizing the dual mode transducer 300 as a tactile alerting device because the impulse output is reliably maximized over that frequency range. As will be described below, those impulse responses which lie on the curve 600 above the operating state 612 are suitable for providing audible responses. In addition, the response to audio input frequencies above the operating state 612 are enhanced by the harmonic responses of the dual mode transducer 300.

Figure 7:
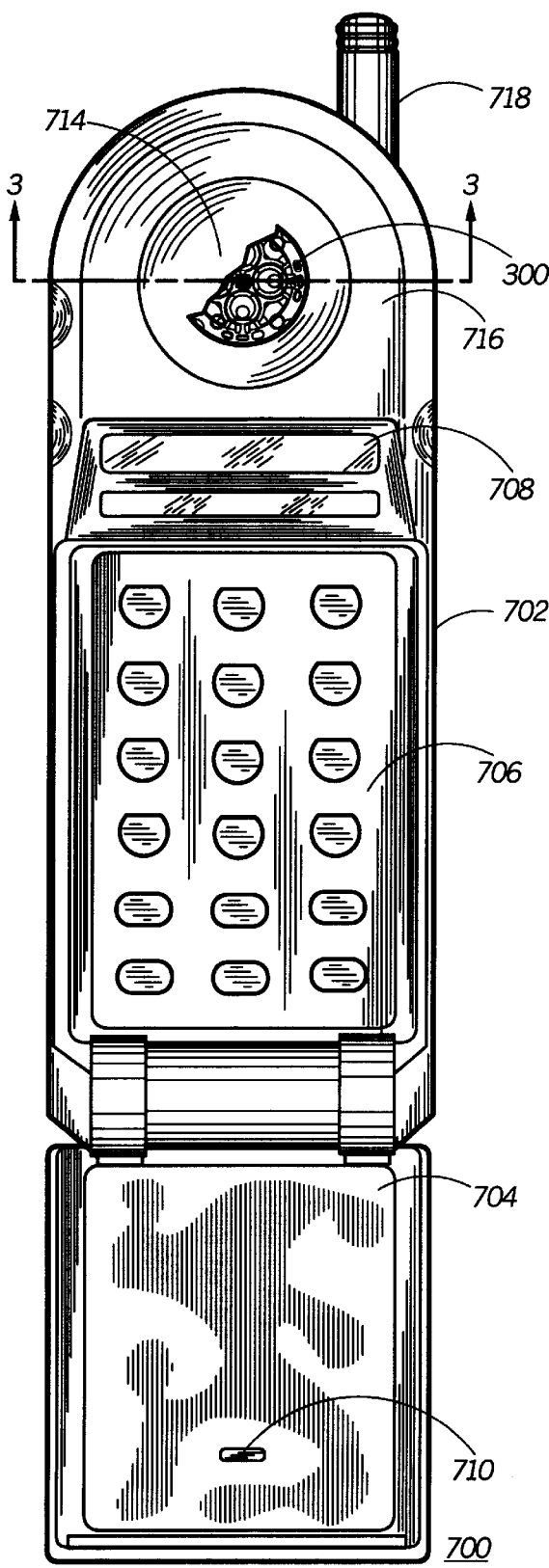
FIG. 7 is an orthogonal front view of a personal portable radiotelephone utilizing a prior art method of mounting the dual mode transducer of FIGS. 3 and 4.

FIG. 7 is an orthogonal front view of a personal portable radiotelephone 700 utilizing the dual mode transducer 300 shown in FIGS. 3 and 4. The personal portable radiotelephone 700, such as a Silver link 2000 Personal Telephone manufactured by Motorola Inc., of Schaumburg, Ill., includes a housing 702 for enclosing transceiver circuits utilized to provide two-way radio frequency communication with other personal portable radiotelephones or to a telephone coupled to a conventional telephone network. A keypad 706, coupled to the housing 702, allows the user to enter information, such as a telephone number or a password, and a display 708 is provided to display the telephone number entered to be dialed or the password. A microphone 710 is located within a hinged housing member 704, and the dual mode transducer 300 is mounted to the upper portion 716 of the housing 702. The housing portion identified as 714 functions as a soundboard, as will be described below, and has been cutaway in part to reveal the dual mode transducer 300. The dual mode transducer 300 functions in one mode as a tactile alerting device, and in a second mode as an audio range transducer. Transmission and reception of the two way radio communication signals is provided by an antenna 718.

Figure 8:
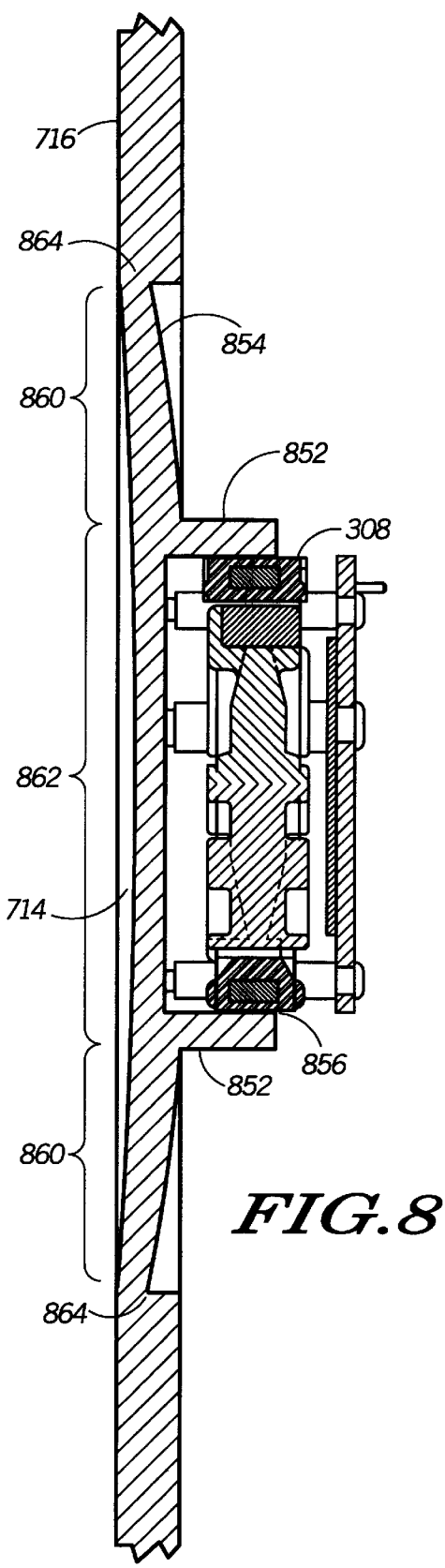
FIG. 8 is a cross-sectional view taken along the line 3—3 of FIG. 7 showing the prior art method of mounting the dual mode transducer in the portable radiotelephone housing.

FIG. 8 is a cross-sectional view taken along the line 3—3 of FIG. 7 showing one mounting method for the dual mode transducer 300 in the portable radiotelephone housing 702. The sound board 714 is integrally molded as a part of the upper housing 716 using conventional injection molding techniques and thermoset plastic materials. A ring 852 having a circular periphery is formed contiguous to the back surface of the sound board 714, and is used to mount the dual mode transducer 300, as shown. The dual mode transducer 300 is attached at the perimeter 856 of the coil form 308 to the ring 852 and is preferably held in place using an adhesive, such as a cyanoacrylate or epoxy adhesive. The front surface of the sound board 714 has a concave profile which in part identifies the position of the dual mode transducer 300, and contributes to the soundboard compliance, as will be described below. There are no sound porting holes as is required with a conventional acoustic transducer, such as an electromagnetic speaker. The soundboard 714 has a generally uniform thickness which tapers to a reduced thickness at the periphery 864, the tapering contributing to the compliance of the soundboard 714, thereby establishing the resonance of the soundboard 714. When the magnetic motional mass 316, 320 is set into movement, the movement of the magnetic motional mass 316, 320 is transformed into tactile or acoustic energy through the planar non-linear spring members which couple to the electromagnetic driver, and which further in turn couples to the sound board 714 through the circular ring 852. The soundboard 714 functions as an earpiece for the transmission of the tactile or acoustic energy to the user. The acoustic energy is delivered primarily by means of bone conduction when the housing is placed in contact with the user's ear, as will be described in further detail below.

As stated above, the resonance of the soundboard 714 is established by the soundboard compliance. It should be noted that the soundboard compliance is controlled by the overall soundboard size, depicted as the circular soundboard 714, and the stiffness of the annular soundboard region 860. The motional energy generated by the dual mode transducer 300 is coupled to the soundboard 714 circumferentially about the central soundboard region 862 to the annular soundboard region 860. It will be appreciated that many devices have only limited housing surface area to provide a soundboard, such as the portable radiotelephone device shown in FIG. 7. As a consequence, because the annular soundboard region 860 is relatively narrow as compared to the overall active area of the soundboard 714, the soundboard resonance is relatively high, as is shown in FIG. 10 described below.

Figure 9:
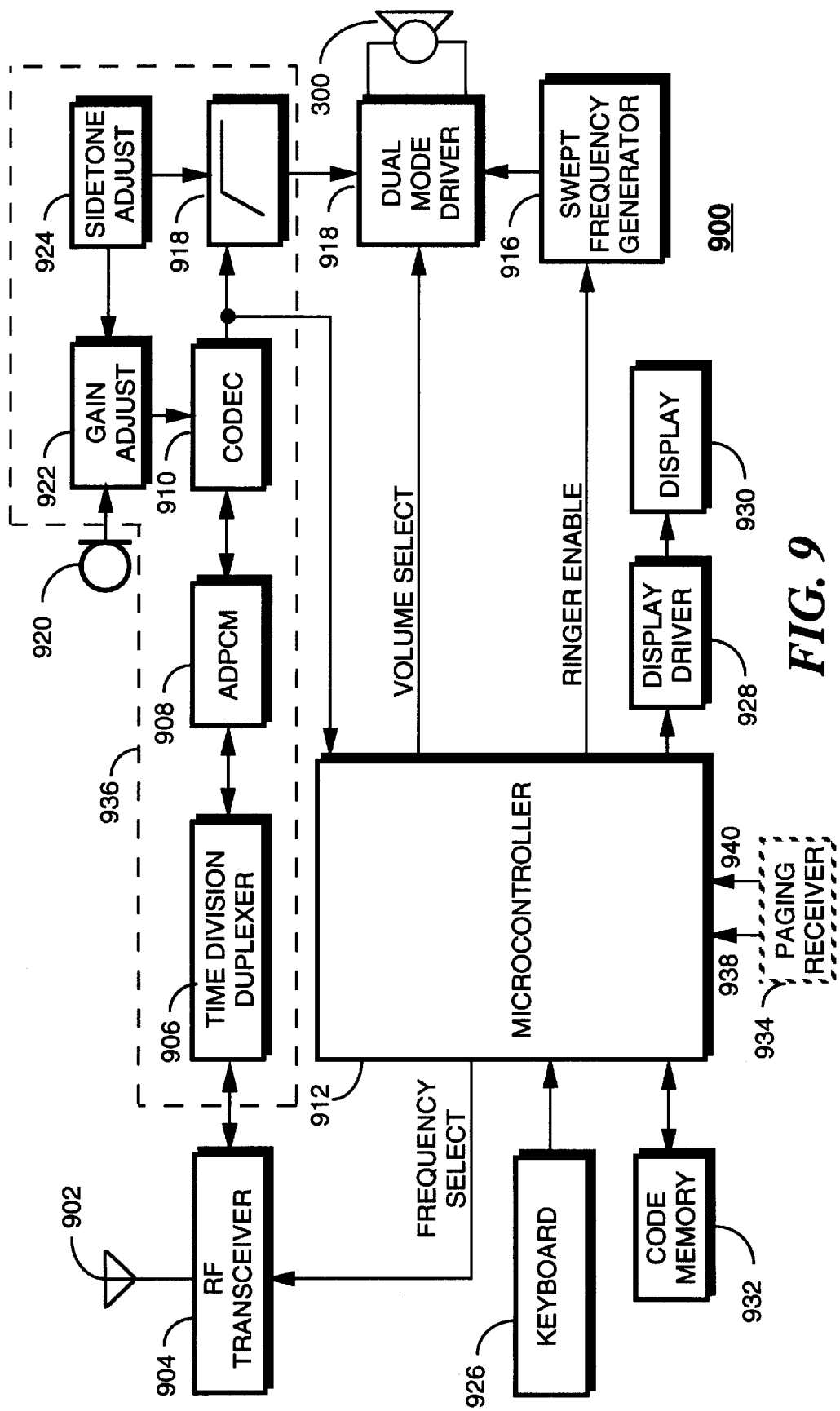
FIG. 9 is an electrical schematic diagram of a personal portable radiotelephone utilizing the dual mode transducer of FIGS. 3 and 4.

FIG. 9 is an electrical block diagram of the portable radiotelephone 700 shown in FIG. 7 which utilizes the dual mode transducer 300. Audio messages are transmitted over a radio frequency channel and received using a well known signaling protocol, such as the CT2 (Second Generation Cordless) Common Air Interface protocol in which audio signals are processed using adaptive differential pulse code modulation techniques and transmitted in a time division duplex manner. As shown in FIG. 9, transmitted audio message signals are intercepted by antenna 902 and processed by radio frequency transceiver 904 to provide a recovered audio message signal having time division duplexed information. A processing means 936 comprising a time division duplexer 906, an adaptive differential pulse code modulator/demodulator 908 and a codec 910 process the detected voice message signals, as will be described below. The time division duplexed audio message signals are processed by a time division duplexer 906 which recovers the received channel information in the form of a 4-bit adaptive differential pulse modulated signal which is processed by the adaptive differential pulse code modulator/demodulator 908 to produce an 8-bit pulse code modulated output. The 8-bit pulse code modulated signal is coupled to the input of a codec 910 which converts the pulse code modulated signal into an analog signal representative of an audio ringer signal followed by the original audible voice message. The audio ringer signal is coupled to and detected by a ring detector circuit which is a function performed within the micro controller 1912. When the audio ringer signal is detected, a ringer enable signal is generated by the micro controller 912 which is coupled to a swept low frequency signal generator 916 which generates a swept sub-audible frequency signal. The swept sub-audible frequency signal is preferably swept repeatedly over a predetermined time interval, such as at 550 millisecond time intervals during the time in which the audio ringer signal is received. The frequency range of the swept sub-audible frequency signal is a function of the dual mode transducer design, and covers frequency ranges of typically from 70–110 Hz to 105–190 Hz. The frequency ranges are selected which provide the highest susceptibility to tactile stimulation to the device user.

Figure 10:
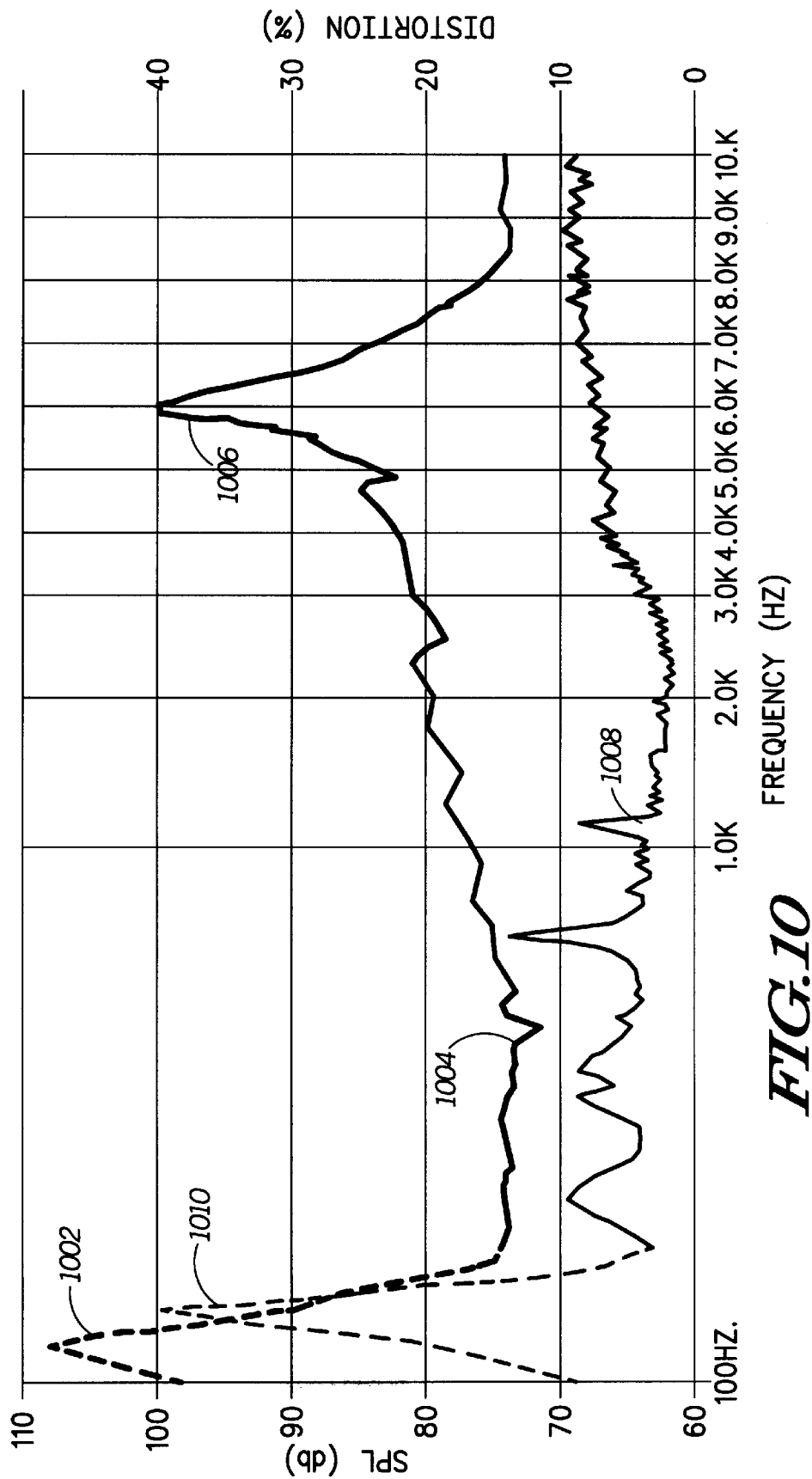
FIG. 10 is a graph showing the frequency response of the dual mode transducer in accordance with the prior art mounting method of FIG. 8.

The response of the dual mode transducer 300 to the swept sub audible frequency signal is shown in FIG. 10, which is a graph showing the overall frequency response of the dual mode transducer 300 using the prior art mounting method in the portable radiotelephone housing 702. As the dual mode transducer 300 is swept over the sub audible frequency range, a prominent response 1002 is generated at the fundamental resonant frequency of the dual mode transducer 300, imparting significant tactile energy to the portable transceiver housing 702. As the frequency input is increased, the tactile energy output drops rapidly, as previously described in FIG. 6. A relatively constant audible output 1004 is produced enabling the dual mode transducer 300 to function as an audible transducer over the received voice message frequency range. The dual mode transducer 300 output 1006 again peaks at a relatively high frequency, as shown in the example of FIG. 10 at 6 kilo-Hertz, the resonant frequency of the sound board 714, which as described above, is high due to the relatively low compliance of the annular soundboard region 860 which leads to a relatively high soundboard stiffness. As can be seen in FIG. 10, the audible distortion 1008 remains relatively constant and low over the majority of the audible, or voice, message frequency range. As would be expected, the audible distortion peaks 1010 significantly at the fundamental resonant frequency of the dual mode transducer 300, with lesser peaks caused by secondary soundboard 714 and/or dual mode transducer 300 responses.

Returning to FIG. 9, in order to control the tactile response of the dual mode transducer 300, a high pass filter 914 which is part of the processing means 936 is placed in the received audio path, significantly attenuating those frequencies received within the audio message at the fundamental resonant frequency of the dual mode transducer. The filtered audible message signal is coupled to a dual mode driver circuit which amplifies and couples the audible message signal to the dual mode transducer.

A microphone 920, gain adjust circuit 922 and sidetone adjust circuit 924 allow the portable transceiver user to deliver an audible message in a manner well known in the art. As with the received audible signal, the output of the sidetone adjust circuit 924 is coupled to the dual mode transducer 300 through the high pass filter 914 to prevent unwanted tactile responses by the dual mode transducer 300. The audible message generated by the microphone 920 is processed through the codec 910, the adaptive differential pulse code modulator 908, the time division duplexer 906 and the transmitter portion of the transceiver 904 in a manner well known in the art. A keyboard 926 is provided to allow entry of the telephone numbers of called parties or to review stored telephone numbers. The telephone number input is processed by the microcontroller 912 which couples the telephone number information to a display driver 928 for display on a display 930, such as a liquid crystal display. A code memory 932 stores a portable transceiver address and PIN number which are used by the micro controller to enable selectively contacting the portable transceiver 900 when matching selective call address signals are received, and for enabling the portable transceiver 900 to communicate with a telepoint base station in a manner well known in the art.

Unlike conventional portable radiotelephone handsets which decode the received ring signals to generate either a preset audible ring or chirp signal or a ramp-up audible ring or chirp signal to generate an audible ring to alert the user of an incoming phone call, the portable transceiver using a dual mode transducer 300 preferably generates a tactile alert. The tactile alert is advantageous in that when generated either for a newly received call, or as an alert for a "call-waiting" call, the alert signal is not intrusive, i.e. does not disrupt other persons in the vicinity of the user, and does not subject the user to a loud audible alert, should the portable transceiver be held to the user's ear during a conversation while a "call waiting" alert is generated.

Figure 11:
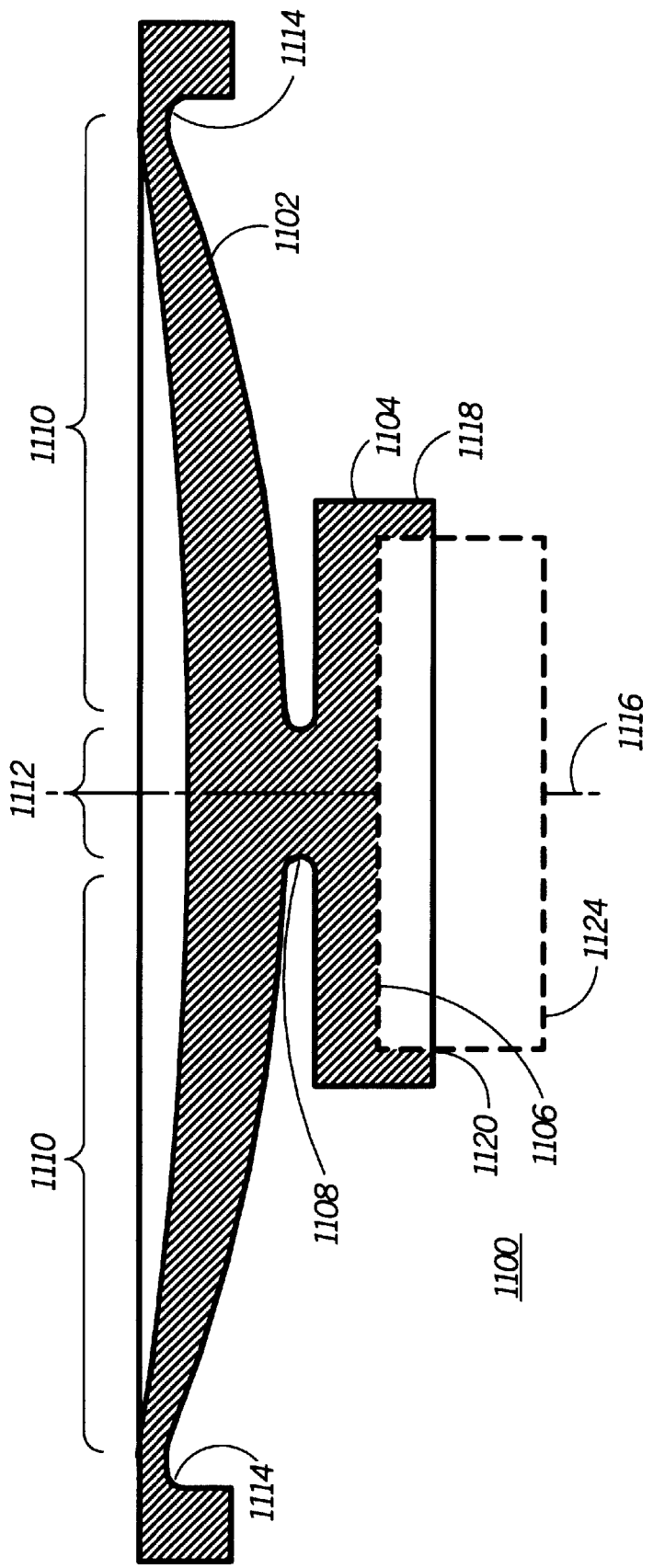
FIG. 11 is a cross-sectional view of the mass excited acoustic device in accordance with the preferred embodiment of the present invention.

FIG. 11 is a cross-sectional view of a mass excited acoustic device 1100 in accordance with the preferred embodiment of the present invention. The mass excited acoustic device comprises a soundboard 1102, having a predetermined resonance frequency which is used to couple motional energy generated by a transducer 1124 to a device user. Coupled to the soundboard 1102 is a pedestal 1104 which acts as a resonant bridge, as will be described below. The pedestal 1104 comprises a platform 1106, and a foot 1108 which are formed contiguous with the back surface of the soundboard 1102 using conventional injection molding techniques and thermoset plastic materials. A ring 1118 having a circular periphery is formed contiguous with the surface of platform 1106, and is used to mount a transducer 1124, such as the dual mode transducer 300. When the dual mode transducer 300 is utilized, the dual mode transducer 300 is attached at the perimeter 1120 of the coil form 308 to the ring 1118 and is preferably held in place using an adhesive, such as a cyanoacrylate or epoxy adhesive. The front surface of the sound board 1102 has a concave profile and is devoid of sound porting holes. The soundboard 1102 has a thickness which radially tapers to a substantially reduced thickness at the periphery 1114. In the preferred embodiment of the present invention, the soundboard thickness is 0.125 inches (3.2 mm) at the perimeter of the central soundboard region 1112 and tapers to 0.035 inches (0.9 mm) at the soundboard perimeter 1114, and produces a soundboard resonance frequency of approximately 2 Kilo-Hertz. The actual shape and dimensions of the soundboard can be empirically adjusted to establish any soundboard resonance frequency commensurate with the overall soundboard area. By adjusting the soundboard resonance of the mass excited acoustic device to provide a low frequency resonance, and by utilizing a transducer which provides a low frequency response, the mass excited acoustic device can be optimized to provide an enhanced bass response, such as would be desirable in high quality audio headphones, as will be described below.

In the preferred embodiment of the present invention, the foot 1106 is 0.145 inches (3.7 mm) in diameter which is substantially less than the 0.700 inch (17.8 mm) diameter of the platform 1106, and substantially smaller yet than the 1.8 inch (45.7 mm) diameter of a circular soundboard 1102, such as shown in FIG. 7. It will be appreciated that other soundboard shapes, such as an oval shape can be utilized as well. For the soundboard dimensions provided above, the area of the foot 1108 is only 0.8 percent of the overall area of the soundboard, as compared to the prior art mounting method shown in FIG. 8 wherein the central soundboard region 862 represents 15 percent of the soundboard area. As a result, the soundboard compliance and actual resonant frequency is determined almost solely by the soundboard design and the compliance of the soundboard between the central soundboard region 1112 and the soundboard periphery 1114, and to a lesser extent by the actual mass of the transducer and platform 1104; and the motional energy generated by the transducer is delivered to the soundboard 1102 through the foot 1108 without substantially modifying the resonance frequency of the soundboard 1102.

Figure 12:
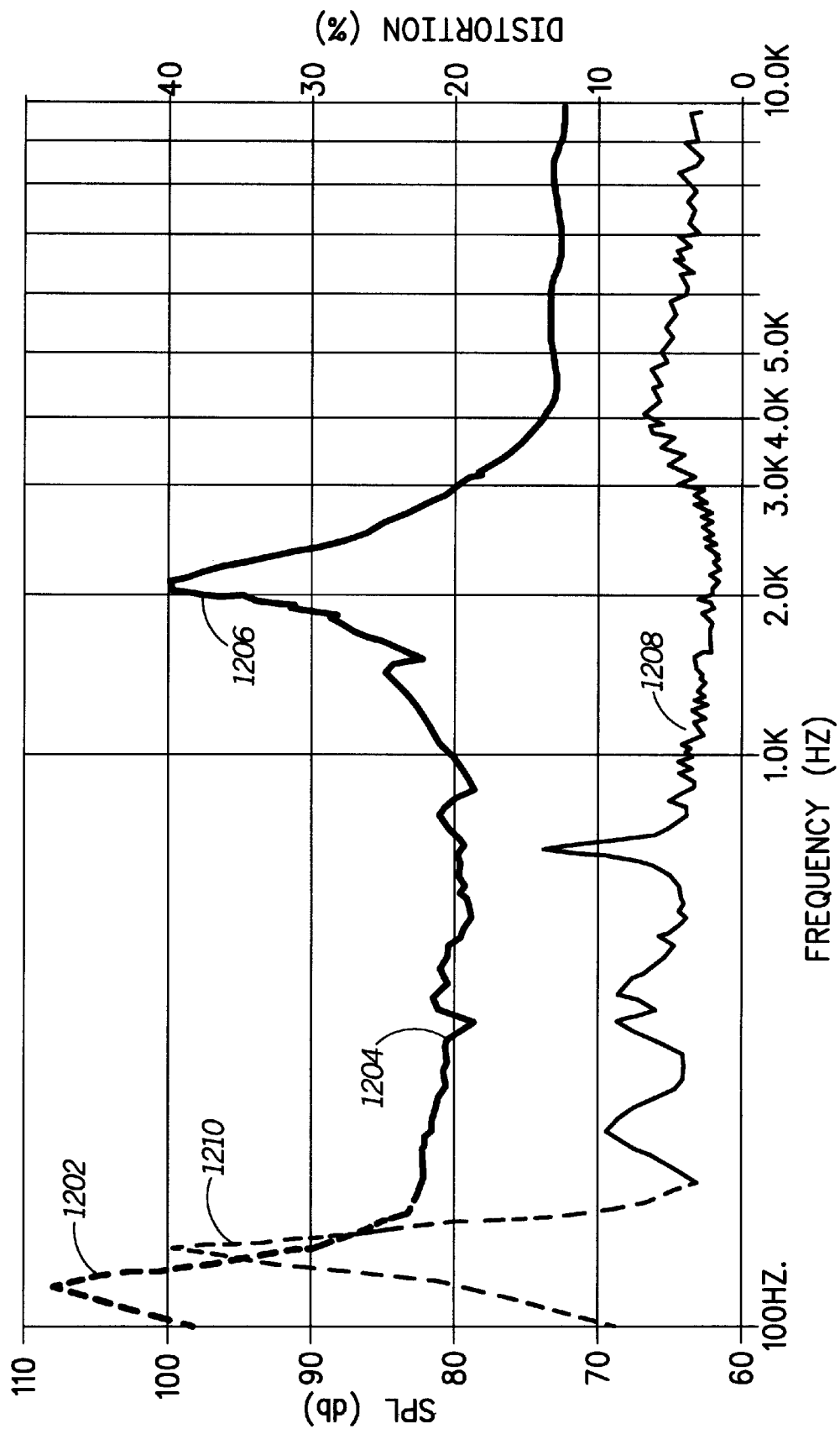
FIG. 12 is a graph showing the frequency response of the mass excited acoustic device in accordance with the preferred embodiment of the present invention.

Because the resonant frequency of the soundboard 1102 is largely unaffected by the mounting of the transducer 1124, soundboards having small overall soundboard areas such as described for the portable radiotelephone 700 can be designed to have enhanced bass response as compared to the soundboard shown in FIG. 8. FIG. 12 is a graph showing the frequency response of a mass excited acoustic device 1100 which provides such an enhanced bass response in accordance with the preferred embodiment of the present invention when implemented into the housing of the portable transceiver 700, utilizing the dual mode transducer 300. As the dual mode transducer 300 is swept over the sub audible frequency range, a prominent response 1202 is generated at the fundamental resonant frequency of the dual mode transducer 300, as described above, imparting significant tactile energy to the portable transceiver housing 702. As the frequency input is increased, the tactile energy output drops rapidly, as previously described in FIG. 6. A relatively constant audible output 1204 is produced enabling the dual mode transducer 300 to function as an audible transducer over the received voice message frequency range. The dual mode transducer 300 output 1206 again peaks at a significantly lower frequency, as shown in the example of FIG. 12 at 2 kilo-Hertz, the resonant frequency of the sound board 714, which as described above, is lower due to the significantly improved compliance of the annual soundboard region 1110 which leads to a significantly lower soundboard stiffness and lower resonance frequency. As can be seen in FIG. 12, the audible distortion 1208 remains relatively constant and low over the majority of the audible, or voice, message frequency range. As would be expected, the audible distortion peaks 1210 significantly at the fundamental resonant frequency of the dual mode transducer 300, with lesser peaks caused by secondary soundboard 1102 and/or dual mode transducer 300 responses.

In summary, unlike the transducer mounting method shown and described in FIG. 8, the motional energy which is generated by the transducer 1124 is transferred through the platform 1106 and the foot 1108 to the soundboard 1102 in a direction parallel to an axis 1116 about which the transducer is mounted and which extends centrally between the platform 1106 and the foot 1108. The motional energy is delivered to the soundboard through the foot without substantially modifying the resonance frequency of the soundboard, because the soundboard compliance is only negligibly changed, except for that induced by the actual transducer mass. While the description above described the mass excited acoustic device as utilizing the dual mode transducer 300, it will be appreciated that other types of transducers, such as an inertia type audio transducer can be utilized as well.

Figure 13:
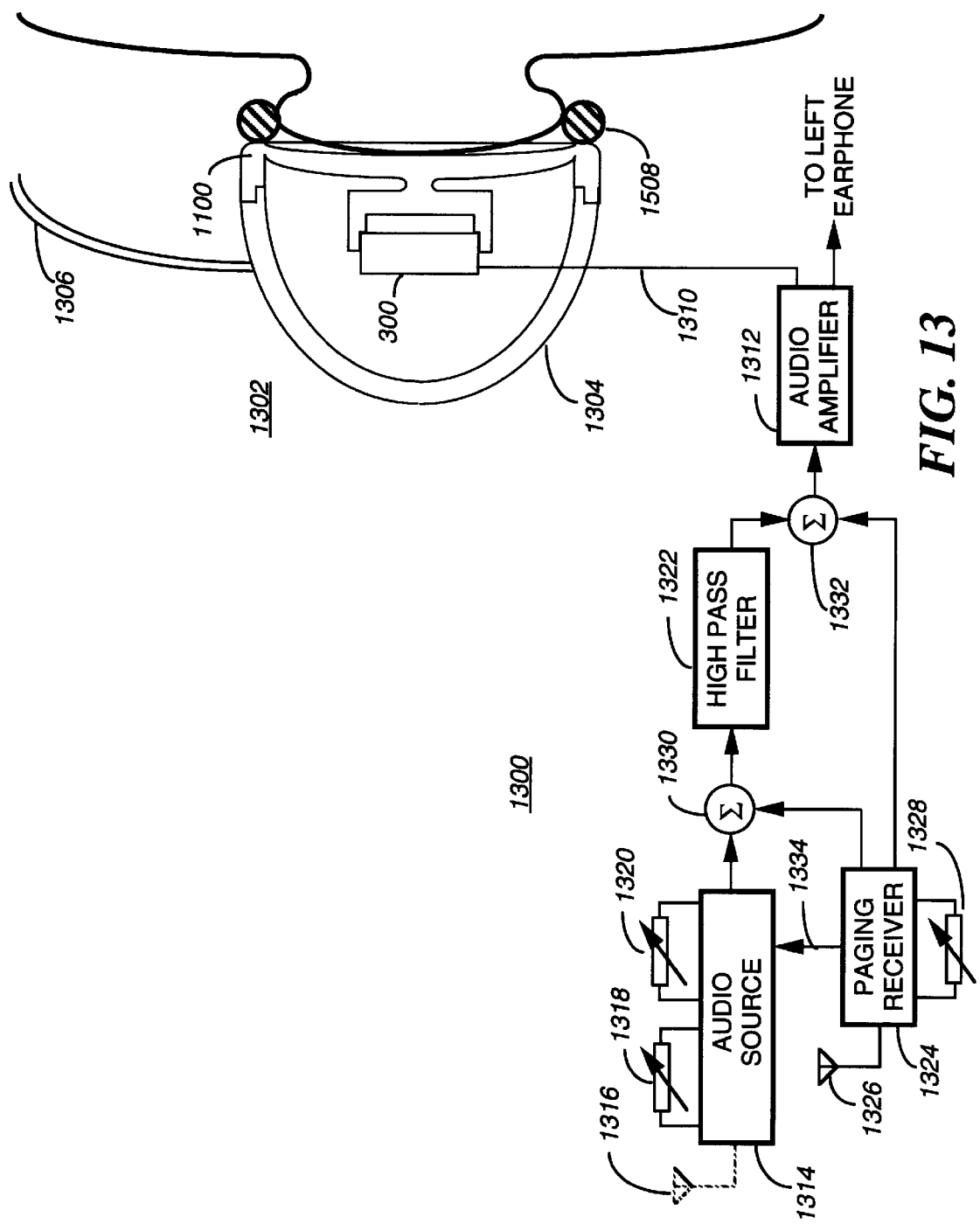
FIG. 13 is an electrical block diagram of an alternate embodiment of the present invention, a headphone system utilizing the mass excited acoustic device having enhanced bass response.

FIG. 13 is an electrical block diagram of a headphone system 1300 utilizing the mass excited acoustic device 1100 in accordance with the preferred embodiment of the present invention to provide an enhanced bass response as described above. The headphone system 1300 can include either a single headphone 1302 which comprises a housing 1304 which encloses the pedestal 1104 and transducer 1124 of the mass excited acoustic device 1100, or a pair of headphones, such as for stereo operation. The headphones 1302 are coupled to a headband 1306, allowing the headphones 1302 to be worn about a users head. A soft compliant cushion 1308, such as manufactured using a foam rubber, can be added to the mass excited acoustic device to improve comfort when wearing the headphones.

Each headphone 1302 is coupled through a conductive cable, or wire, 1310 to an audio output device, such as a stereo audio amplifier 1312. Audio information, provided to the audio amplifier 1312 is provided by an audio source 1314. The audio source 1314 can be a broadcast receiver, such an AM/FM receiver which receives broadcast signals over an antenna 1316. User controls, such as a control 1318 for channel selection and tuning, and control 1320 to control audio program volume, are provided, as well as other controls (not shown) which are well known in the art. The audio source 1314 can also be a cassette tape player/recorder, a CD disk player, or any other well known audio source which is commonly available, portable and accepts external headphones. The audio output from the audio source 1314 is coupled through a high pass filter 1322 to the audio amplifier 1312. The high pass filter 1322 is used to reject frequencies which would ordinarily excite the dual mode transducer 300 into a vibratory mode, thereby insuring that only audio programming is rendered from the headphone 1302.

A paging receiver 1324 can be added to the headphone system 1300 to provide some additional very desirable features. One such feature would be to alert the user of a received page while the user is listening to an audio program. Paging signals are received by an antenna 1326 and processed by the paging receiver 1324 in a manner well known in the art. When an address is received by the paging receiver 1324, a swept, low frequency alert signal is generated, as described above. The alert signal is combined with the program audio in a combining circuit 1332, which typical sums the analog signals together. The summed audio program and alert signal is processed by the audio amplifier 1312 and applied to the dual mode transducer, resulting in a vibratory alert being generated simultaneously with the audio programming. Following the generation of the alert signal, the paging receiver 1324 would generate a muting signal 1334, reducing the audio program volume. The received audio message is then coupled into the high pass filter 1322 through a combining circuit 1330. The received audio message is processed by the high pass filter 1322 to eliminate those frequencies which would generate an undesired vibratory response. The resultant filtered audio message is then processed as described above, enabling the user to hear the received audio message.

FIG. 14 is a signaling diagram depicting the operation for the mass excited acoustic device in accordance with the preferred and alternate embodiments of the present invention. The description to follow will be directed to FIG. 9, although it will be appreciated that the described operation can also be applied to the headphone system of FIG. 13. The paging receiver 934 can be coupled to the microcontroller 912 to provide an indication of a "call waiting" message. When configured using the paging receiver 934, the user of the portable radiotelephone handset 900 can be engaged in a telephone conversation 1402, as shown in FIG. 14. During the ongoing telephone conversation 1402, an address 1404 identifying the portable radiotelephone handset 900, and a corresponding numeric data message 1406 identifying the telephone number of a "call waiting" caller can be received by the paging receiver 934. The address and data message are handled in a manner well known by one of ordinary skill in the art, generating an alert enable signal 938 and a received data signal 940. The alert enable signal 938 is processed by the microcontroller 912 which results in generating a ringer enable signal which is coupled to the swept frequency generator 916 which, as described above, then generates the swept sub-audible frequency signal 1408. The swept sub-audible frequency signal 1408 is coupled to the dual mode driver 918 even as the ongoing telephone conversation 1402 is in progress, resulting in a tactile alert being generated alerting the user of a "call waiting" call simultaneously with the audio of the telephone conversation being carried on. Because the "call waiting" alert is tactile, control of the amplitude of the alerting signal is not critical, as is required when an audible alert signal is generated. The tactile alert signal has the additional advantage of being simultaneously generated with the ongoing telephone conversation, whereas the audible alert would result in an interruption of the ongoing telephone conversation. Once the telephone conversation is ended, the numeric data delivered by the received data signal can be processed by the microcontroller 912, enabling the received telephone number to be displayed on the display 930. Automatic dialing of the received telephone number can be accommodated using the keyboard 926 in a manner well known in the art.

In summary a mass excited acoustic device has been described which offers some distinct advantages over prior art devices which have utilized a transducer coupled to a soundboard. The resonance frequency of the soundboard can be established, and when coupled to the transducer, as described above, only minimal interaction with the resonance frequency will occur. Soundboards having small areas can be designed to have enhanced bass responses. The mass excited acoustic device is compatible for use with many portable devices, and because the soundboard is not perforated, can be used in devices where high water resistance is required. When a dual mode transducer, as described above, is utilized in the mass excited acoustic device, audio programming can be simultaneously reproduced with a tactile alert. When the mass excited acoustic device is used to provide a headphone, excellent low frequency response and wide audio bandwidth can be provided.

We claim:

1. A mass excited acoustic device, comprising:
   a soundboard, having a predetermined resonance frequency, for coupling motional energy to a device user; and
   a pedestal, comprising a foot and a platform which is formed for mounting a transducer, wherein said foot has a cross-sectional area substantially smaller in size than said platform for connecting and separating said platform from said soundboard,
   said transducer for converting an electrical input signal into motional energy generated in a direction along an axis perpendicular to said cross-sectional area of said foot,
   whereby the motional energy is delivered to said soundboard through said foot without substantially modifying the resonance frequency of said soundboard.

2. The mass excited acoustic device according to claim 1, further comprising a housing which is coupled to said soundboard, said housing for enclosing said pedestal and said transducer.

3. The mass excited acoustic device according to claim 1, wherein said platform includes means for mechanically supporting and securing said transducer to said pedestal.

4. The mass excited acoustic device according to claim 1, wherein said soundboard has an inner surface coupled to said foot, and an outer surface, and wherein said outer surface has a concave profile.

5. The mass excited acoustic device according to claim 1, wherein said soundboard has an oval shape and a predetermined thickness which decreases in a predetermined manner radially from center to edge.

6. The mass excited acoustic device according to claim 1, wherein said soundboard has a circular shape and a predetermined thickness which decreases in a predetermined manner radially from center to edge.

7. A mass excited acoustic device, comprising:
   a soundboard, having a predetermined resonance frequency, for coupling motional energy to a device user;
   a pedestal, comprising a foot and a platform, wherein said foot has a cross-sectional area which is substantially smaller in size than said platform for connecting and separating said platform from said soundboard; and
   a dual mode transducer, comprising
   an electromagnetic driver, coupled to said platform, for effecting an alternating electromagnetic field in response to an audio input signal,
   an armature, coupled to said electromagnetic driver and including upper and lower substantially parallel planar suspension members each comprising
   a plurality of independent planar circular non-linear spring members arranged regularly about a central planar region within a planar perimeter region, and
   a magnetic motional mass suspended between said upper and lower substantially parallel planar suspension members about said central planar region, and coupled to said alternating electromagnetic field for alternatively moving said magnetic motional mass in response thereto, wherein movement of said magnetic motional mass is transformed through said plurality of independent planar circular non-linear spring members and said electromagnetic driver into motional energy generated in a direction along an axis perpendicular to said cross-sectional area of said foot, wherein the motional energy is delivered to said soundboard through said foot without substantially modifying the resonance frequency of said soundboard to provide an audio output having an enhanced bass response.

8. The mass excited acoustic device according to claim 7 wherein said plurality of independent planar circular non-linear spring members are defined by circular outer perimeters and elliptical inner perimeters.

9. The mass excited acoustic device in accordance with claim 8 wherein said plurality of independent planar circular non-linear spring members have minimum opposing widths and maximum opposing widths defined by a difference between said elliptical inner perimeters and circular outer perimeters, and wherein said plurality of independent planar circular non-linear spring members are coupled to said central planar region and said planar perimeter region at said maximum opposing widths.

10. The mass excited acoustic device in accordance with claim 9, wherein said maximum opposing widths are twice said minimum opposing widths.

11. The mass excited acoustic device in accordance with claim 7, wherein said electromagnetic driver has a periphery which is substantially circular, and wherein said electromagnetic driver is coupled at said periphery to said platform.

12. The mass excited acoustic device in accordance with claim 7, wherein said plurality of independent planar circular non-linear spring members are in tension during movement of said magnetic motional mass.

13. The mass excited acoustic device in accordance with claim 7 wherein the motional energy generated by movement of said magnetic motional mass in response to the alternating electromagnetic field produces acoustic energy when an audible input signal is coupled to said electromagnetic driver.

14. The mass excited acoustic device in accordance with claim 7 wherein the motional energy generated by movement of said magnetic motional mass in response to the alternating electromagnetic field produces tactile energy when a sub-audible input signal is coupled to said electromagnetic driver.

15. The mass excited acoustic device in accordance with claim 7 wherein said armature and said magnetic motional mass form a resonant armature system having a fundamental mode resonant frequency and a displacement amplitude associated therewith.

16. The mass excited acoustic device in accordance with claim 15 wherein the displacement amplitude of said magnetic motional mass increases non-linearly over a predetermined frequency range above the fundamental mode resonant frequency.

17. An audio delivery system, comprising:
an audio source for generating audio input signals; processing means for processing the audio input signals for driving a transducer; and
one or more mass excited acoustic devices, comprising
a soundboard, having a predetermined resonance frequency, for coupling motional energy delivered thereto to a device user, and
a pedestal, comprising a foot and a platform formed for mounting a transducer, wherein said foot has a cross-sectional area which is substantially smaller in size than said platform for connecting and separating said platform from said soundboard,
said transducer, for converting the audio input signals into motional energy generated in a direction along an axis perpendicular to said cross-sectional area of said foot, wherein the motional energy is delivered to said soundboard through said foot without substantially modifying the resonance frequency of said soundboard, and
a housing, coupled to said soundboard, said housing for enclosing said pedestal and said transducer.

18. The audio delivery system according to claim 17, wherein said transducer comprises:
an electromagnetic driver for effecting an alternating electromagnetic field in response to an input signal; and
an armature, coupled to said electromagnetic driver, and including upper and lower substantially parallel planar suspension members each comprising
a plurality of independent planar circular non-linear spring members arranged regularly about a central planar region within a planar perimeter region, and
a magnetic motional mass suspended between said upper and lower substantially parallel planar suspension members about said central planar region, and coupled to said alternating electromagnetic field for alternatively moving said magnetic motional mass in response thereto, wherein movement of said magnetic motional mass being transformed through said plurality of independent planar circular non-linear spring members and said electromagnetic driver into motional energy generated in a direction parallel to said axis.

19. The audio delivery system according to claim 18, wherein said plurality of independent planar circular non-linear spring members are defined by circular outer perimeters and elliptical inner perimeters.

20. A personal communication device, comprising:
a housing having a portion thereof forming a soundboard having a predetermined resonance frequency;
a pedestal, enclosed within said housing and comprising a platform and a foot, wherein said foot has a cross-sectional area which is substantially smaller in size than said platform for connecting and separating said platform from said soundboard;
a receiver, enclosed within said housing, for receiving and detecting coded message signals transmitted thereto;
processing means for processing the detected coded message signals; and
a transducer comprising
an electromagnetic driver, coupled to said platform, for effecting an alternating electromagnetic field in response to the coded message signals which are processed,
an armature, coupled to said electromagnetic driver and including upper and lower substantially parallel planar suspension members, each comprising a plurality of independent planar circular non-linear spring members arranged regularly about a central planar region within a planar perimeter region, and
a magnetic motional mass suspended between said upper and lower substantially parallel planar suspension members about said central planar region, and coupled to said alternating electromagnetic field for alternatively moving said magnetic motional mass in response thereto, wherein movement of said magnetic motional mass being transformed through said plurality of independent planar circular non-linear spring members and said electromagnetic driver into motional energy generated in a direction alone an axis perpendicular to said cross-sectional area of said foot.

21. The personal communication device according to claim 20, wherein said plurality of independent planar circular non-linear spring members are defined by circular outer perimeters and elliptical inner perimeters.

22. The personal communication device according to claim 20, wherein said coded message signals include at least an address signal associated therewith, and wherein said processing means comprises
a controller, responsive to the address signal matching a predetermined personal communication device address, for generating a sub-audible alerting signal being coupled to said electromagnetic driver for effecting an alternating electromagnetic field in response thereto,
wherein motion of said magnetic motional mass is transformed through said plurality of independent planar circular non-linear spring members and said electromagnetic driver into tactile energy to provide a vibratory response which is coupled through said soundboard to a user.

23. The personal communication device according to claim 22, wherein said coded message signals further include a voice message signal associated with the address signal, and wherein said processing means processes the voice message signal which is coupled to said electromagnetic driver for effecting the alternating electromagnetic field in response thereto,
wherein motion of said magnetic motional mass is transformed through said plurality of independent planar circular non-linear spring members and said electro magnetic driver into acoustic energy to provide an audible response which is coupled through said soundboard to the user.

24. The personal communication device according to claim 22 wherein said processing means comprises a high pass filter to attenuate received voice message signals below 150 Hz.

25. The personal communication device according to claim 23, wherein said coded message signals further include a call waiting signal interleaved with the voice message signal, and wherein said processing means processes the call waiting signal and the voice message signal, wherein the motion of said magnetic motional mass is transformed through said plurality of independent planar circular non-linear spring members and said electromagnetic driver into tactile and acoustic energy to provide both vibratory and audible responses which are coupled through said soundboard to the user.

* * * * *